(12) United States Patent
Sato

(10) Patent No.: US 7,602,558 B2
(45) Date of Patent: Oct. 13, 2009

(54) ZOOM LENS AND IMAGING APPARATUS

(75) Inventor: Kenichi Sato, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 12/167,675

(22) Filed: Jul. 3, 2008

(65) Prior Publication Data

US 2009/0027779 A1  Jan. 29, 2009

(30) Foreign Application Priority Data

Jul. 23, 2007  (JP) ............................ P2007-190729

(51) Int. Cl.
*G02B 15/14* (2006.01)
(52) U.S. Cl. .................... 359/687; 359/678; 359/726
(58) Field of Classification Search .............. 359/676, 359/678, 686, 687, 726–736; 396/72–88; 348/240.99–240.3, 335–369

See application file for complete search history.

(56) References Cited

U.S. PATENT DOCUMENTS 7,295,380 B2  11/2007  Sueyoshi et al.
7,315,423 B2   1/2008  Sato et al.
7,372,635 B2 * 5/2008  Morooka et al. ............ 359/687
2007/0285520 A1 * 12/2007 Kuroda .................. 348/208.11

FOREIGN PATENT DOCUMENTS

| JP | 2000-131610 A | 5/2000 |
| JP | 2004-354869 A | 12/2004 |
| JP | 2006-267862 A | 10/2006 |

* cited by examiner

*Primary Examiner*—Darryl J Collins
(74) *Attorney, Agent, or Firm*—Birch, Stewart, Kolasch & Birch, LLP

(57) ABSTRACT

A zoom lens is provided and includes: in order from the object side, a first lens group having a positive power and including in order from the object side, a negative lens, a reflecting member that bends an optical path by substantially 90°, and a positive lens having biconvex shape which has at least one aspherical surface; a second lens group having a negative power and including two lenses; a third lens group having a positive power; and a fourth lens group having a positive power and including in order from the object side, a cemented lens having a negative power and a positive lens having a meniscus shape which has at least one aspherical surface and a convex surface on the object side. The zoom lens is adapted to change a magnification thereof by moving the second lens group and forth lens group, and satisfies specific conditional equations.

5 Claims, 23 Drawing Sheets

EXAMPLE 1

| | EXAMPLE 1 · BASIC LENS DATA | | | | |
|---|---|---|---|---|---|
| | Si (SURFACE NUMBER) | Ri (RADIUS OF CURVATURE) | Di (SURFACE SPACING) | Ndj (REFRACTIVE INDEX) | νdj (ABBE NUMBER) |
| G1 | 1 | 78.6040 | 0.760 | 1.80610 | 33.3 |
| | 2 | 9.2291 | 2.200 | | |
| | 3 | ∞ | 8.100 | 1.78590 | 44.2 |
| | 4 | ∞ | 0.150 | | |
| | *5 | 12.3382 | 3.000 | 1.47136 | 76.6 |
| | *6 | −10.1956 | D6 (VARIABLE) | | |
| G2 | 7 | −17.3082 | 0.580 | 1.72916 | 54.7 |
| | 8 | 7.4995 | 0.300 | | |
| | 9 | 6.7251 | 1.500 | 1.92286 | 18.9 |
| | 10 | 8.7968 | D10 (VARIABLE) | | |
| G3 | *11 | 9.2115 | 1.200 | 1.51007 | 56.2 |
| | *12 | 382.0314 | 0.800 | | |
| | 13 (APERTURE DIAPHRAGM) | — | D13 (VARIABLE) | | |
| G4 | 14 | 6.2651 | 2.300 | 1.71300 | 53.9 |
| | 15 | −13.7294 | 0.610 | 1.68893 | 31.1 |
| | 16 | 4.8502 | 0.120 | | |
| | *17 | 5.4260 | 1.400 | 1.51007 | 56.2 |
| | *18 | 11.5102 | D18 (VARIABLE) | | |
| GC | 19 | ∞ | 0.850 | 1.51680 | 64.2 |
| | IMG | ∞ | 0.000 | | |

(* = ASPHERIC SURFACE)
(f = 6.8~19.4mm, FNO. = 3.8~4.3, 2ω = 61.5°~21.4°)

(B)

| EXAMPLE 1 · VARIABLE SURFACE SPACING DATA | | | | |
|---|---|---|---|---|
| | D6 | D10 | D13 | D18 |
| WIDE ANGLE END | 0.50 | 10.09 | 5.20 | 10.55 |
| TELEPHOTO END | 9.91 | 0.68 | 2.09 | 13.66 |

FIG. 7

| EXAMPLE 1 · ASPHERICAL DATA | | | |
|---|---|---|---|
| ASPHERICAL COEFFICIENT | SURFACE NUMBER | | |
| | FIFTH SURFACE | SIXTH SURFACE | ELEVENTH SURFACE |
| KA | 9.2060570E-01 | 9.2229970E-01 | 9.2191790E-01 |
| A3 | -4.4043777E-04 | -4.6485659E-04 | 7.7677497E-04 |
| A4 | 6.3814734E-05 | 2.9936913E-04 | -1.1491214E-04 |
| A5 | -3.5918187E-05 | -3.0903872E-05 | 6.8695505E-06 |
| A6 | 3.5427013E-06 | 1.2238832E-06 | -1.6674803E-06 |
| A7 | -4.2112357E-07 | 5.4823664E-08 | -6.5008436E-08 |
| A8 | 1.3500557E-09 | 6.0458681E-08 | 2.3038168E-06 |
| A9 | -1.1060821E-08 | -1.6890199E-08 | 8.9432100E-10 |
| A10 | -4.9792332E-10 | -4.2884037E-09 | -1.2729212E-07 |
| A11 | -4.4637783E-10 | -2.9147304E-10 | — |
| A12 | 8.1593572E-12 | 8.2611725E-11 | — |
| | TWELFTH SURFACE | SEVENTEENTH SURFACE | EIGHTEENTH SURFACE |
| KA | 9.9912990E-01 | 1.4800431E+00 | 1.1314109E+00 |
| A3 | 8.3092944E-04 | 2.9044963E-04 | 4.8750591E-04 |
| A4 | -7.1564791E-05 | 1.1302460E-03 | 3.1598743E-03 |
| A5 | 6.6906232E-06 | -7.3139907E-05 | -5.3329395E-05 |
| A6 | 3.2648122E-05 | 2.5578363E-05 | 7.3978703E-05 |
| A7 | -6.7614854E-08 | 1.3306082E-07 | -5.0762288E-07 |
| A8 | -2.0195312E-06 | 2.6137989E-06 | 1.0867646E-05 |
| A9 | -5.4320652E-10 | -6.0792058E-10 | 4.0119027E-10 |
| A10 | 1.0928996E-07 | 7.2910304E-08 | 1.8031882E-07 |
| A11 | — | -2.7145271E-11 | -1.7977835E-10 |
| A12 | — | 3.8914623E-12 | -2.2935557E-11 |

| | EXAMPLE 2 · BASIC LENS DATA | | | | |
|---|---|---|---|---|---|
| | Si (SURFACE NUMBER) | Ri (RADIUS OF CURVATURE) | Di (SURFACE SPACING) | Ndj (REFRACTIVE INDEX) | υdj (ABBE NUMBER) |
| G1 | 1 | 93.4641 | 0.760 | 1.80610 | 33.3 |
| | 2 | 9.0620 | 2.200 | | |
| | 3 | ∞ | 8.100 | 1.78590 | 44.2 |
| | 4 | ∞ | 0.150 | | |
| | *5 | 12.3292 | 2.900 | 1.47136 | 76.6 |
| | *6 | -9.9550 | D6(VARIABLE) | | |
| G2 | 7 | -17.6356 | 0.570 | 1.72916 | 54.7 |
| | 8 | 7.4331 | 0.300 | | |
| | 9 | 6.7236 | 1.350 | 1.92286 | 18.9 |
| | 10 | 8.9726 | D10(VARIABLE) | | |
| G3 | *11 | 9.1846 | 1.100 | 1.51007 | 56.2 |
| | *12 | 337.6863 | 0.800 | | |
| | 13 (APERTURE DIAPHRAGM) | — | D13(VARIABLE) | | |
| G4 | 14 | 6.3222 | 2.350 | 1.69680 | 55.5 |
| | 15 | -13.7739 | 0.560 | 1.68893 | 31.1 |
| | 16 | 4.9284 | 0.080 | | |
| | *17 | 5.4594 | 1.484 | 1.51007 | 56.2 |
| | *18 | 11.4073 | D18(VARIABLE) | | |
| GC | 19 | ∞ | 0.850 | 1.51680 | 64.2 |
| | IMG | ∞ | 0.000 | | |

(* = ASPHERIC SURFACE)
(f = 6.7~19.0mm, FNO. = 3.9~4.3, 2ω = 62.6°~21.7°)

(B)

| EXAMPLE 2 · VARIABLE SURFACE SPACING DATA | | | | |
|---|---|---|---|---|
| | D6 | D10 | D13 | D18 |
| WIDE ANGLE END | 0.50 | 11.05 | 5.20 | 10.65 |
| TELEPHOTO END | 10.33 | 1.22 | 2.46 | 13.39 |

FIG. 9

| EXAMPLE 2 · ASPHERICAL DATA | | | |
|---|---|---|---|
| ASPHERICAL COEFFICIENT | SURFACE NUMBER | | |
| | FIFTH SURFACE | SIXTH SURFACE | ELEVENTH SURFACE |
| KA | 9.2209670E-01 | 9.1820470E-01 | 9.1999120E-01 |
| A3 | -3.6849605E-04 | -3.2688252E-04 | 8.3460079E-04 |
| A4 | 6.9922216E-05 | 3.0275563E-04 | -1.1861336E-04 |
| A5 | -3.5638350E-05 | -3.0871115E-05 | 6.4875178E-06 |
| A6 | 3.5691829E-06 | 1.2684584E-06 | -1.6912384E-06 |
| A7 | -4.2594490E-07 | 6.3493282E-08 | -6.5886428E-08 |
| A8 | 3.5897037E-10 | 6.1760466E-08 | 2.3037868E-06 |
| A9 | -1.1172697E-08 | -1.6761918E-08 | 8.9388045E-10 |
| A10 | -5.1076646E-10 | -4.2745534E-09 | -1.2729208E-07 |
| A11 | -4.4747187E-10 | -2.9033504E-10 | — |
| A12 | 8.0500814E-12 | 8.2716436E-11 | — |
| | TWELFTH SURFACE | SEVENTEENTH SURFACE | EIGHTEENTH SURFACE |
| KA | 9.9912990E-01 | 1.4886572E+00 | 1.1307636E+00 |
| A3 | 8.2478379E-04 | 2.9488533E-04 | 4.8368495E-04 |
| A4 | -7.1382064E-05 | 1.1342564E-03 | 3.1581760E-03 |
| A5 | 6.8649683E-06 | -7.2929598E-05 | -5.3477268E-05 |
| A6 | 3.2662270E-05 | 2.5586284E-05 | 7.3971114E-05 |
| A7 | -6.6993804E-08 | 1.3316981E-07 | -5.0784089E-07 |
| A8 | -2.0195040E-06 | 2.6137928E-06 | 1.0867642E-05 |
| A9 | -5.4241833E-10 | -6.0866381E-10 | 4.0117194E-10 |
| A10 | 1.0929000E-07 | 7.2910255E-08 | 1.8031885E-07 |
| A11 | — | -2.7146216E-11 | -1.7977596E-10 |
| A12 | — | 3.8920516E-12 | -2.2934742E-11 |

| | EXAMPLE 3 · BASIC LENS DATA | | | | |
|---|---|---|---|---|---|
| | Si (SURFACE NUMBER) | Ri (RADIUS OF CURVATURE) | Di (SURFACE SPACING) | Ndj (REFRACTIVE INDEX) | νdj (ABBE NUMBER) |
| G1 | 1 | 78.6693 | 0.760 | 1.90366 | 31.3 |
| | 2 | 9.3885 | 1.400 | | |
| | 3 | ∞ | 8.100 | 1.78590 | 44.2 |
| | 4 | ∞ | 0.150 | | |
| | *5 | 11.8349 | 3.000 | 1.48749 | 70.4 |
| | *6 | -10.1045 | D6 (VARIABLE) | | |
| G2 | 7 | -17.6547 | 0.580 | 1.72916 | 54.7 |
| | 8 | 7.1728 | 0.300 | | |
| | 9 | 6.6871 | 1.500 | 1.92286 | 18.9 |
| | 10 | 9.1389 | D10 (VARIABLE) | | |
| G3 | *11 | 9.6276 | 1.200 | 1.51007 | 56.2 |
| | *12 | 254.0404 | 0.800 | | |
| | 13 (APERTURE DIAPHRAGM) | — | D13 (VARIABLE) | | |
| G4 | 14 | 6.3222 | 2.350 | 1.69680 | 55.5 |
| | 15 | -13.7739 | 0.560 | 1.68893 | 31.1 |
| | 16 | 4.9284 | 0.080 | | |
| | *17 | 5.4594 | 1.484 | 1.51007 | 56.2 |
| | *18 | 11.4073 | D18 (VARIABLE) | | |
| GC | 19 | ∞ | 0.850 | 1.51680 | 64.2 |
| | IMG | ∞ | 0.000 | | |

(* = ASPHERIC SURFACE)
(f = 6.8~19.4mm, FNO. = 3.8~4.3, 2ω = 61.7°~21.3°)

(B)

| EXAMPLE 3 · VARIABLE SURFACE SPACING DATA | | | | |
|---|---|---|---|---|
| | D6 | D10 | D13 | D18 |
| WIDE ANGLE END | 0.50 | 10.23 | 5.20 | 10.73 |
| TELEPHOTO END | 10.05 | 0.68 | 2.12 | 13.84 |

FIG. 11

| EXAMPLE 3 · ASPHERICAL DATA | | | |
|---|---|---|---|
| ASPHERICAL COEFFICIENT | SURFACE NUMBER | | |
| | FIFTH SURFACE | SIXTH SURFACE | ELEVENTH SURFACE |
| KA | 9.1915230E-01 | 9.2284820E-01 | 9.2593780E-01 |
| A3 | -4.3874899E-04 | -4.4147811E-04 | 7.8014750E-04 |
| A4 | 5.7748352E-05 | 2.9803146E-04 | -1.0635326E-04 |
| A5 | -3.7024323E-05 | -3.0659716E-05 | 7.4582348E-06 |
| A6 | 3.4338172E-06 | 1.2482107E-06 | -1.6313408E-06 |
| A7 | -4.2568228E-07 | 5.3385069E-08 | -6.3336836E-08 |
| A8 | 1.4925568E-09 | 5.9799282E-08 | 2.3039103E-06 |
| A9 | -1.1002820E-08 | -1.6985627E-08 | 8.9871561E-10 |
| A10 | -4.8811254E-10 | -4.3015263E-09 | -1.2729200E-07 |
| A11 | -4.4537219E-10 | -2.9275680E-10 | — |
| A12 | 8.2269898E-12 | 8.2479381E-11 | — |
| | TWELFTH SURFACE | SEVENTEENTH SURFACE | EIGHTEENTH SURFACE |
| KA | 9.9912980E-01 | 1.4427833E+00 | 1.1330739E+00 |
| A3 | 8.1903614E-04 | 2.6161835E-04 | 4.4388562E-04 |
| A4 | -7.8825058E-05 | 1.1175923E-03 | 3.1675645E-03 |
| A5 | 6.2957208E-06 | -7.3734333E-05 | -5.2911282E-05 |
| A6 | 3.2627205E-05 | 2.5551852E-05 | 7.3998186E-05 |
| A7 | -6.8484568E-08 | 1.3217287E-07 | -5.0696628E-07 |
| A8 | -2.0195771E-06 | 2.6137614E-06 | 1.0867674E-05 |
| A9 | -5.4512899E-10 | -6.0949857E-10 | 4.0188627E-10 |
| A10 | 1.0928975E-07 | 7.2910254E-08 | 1.8031889E-07 |
| A11 | — | -2.7147111E-11 | -1.7977486E-10 |
| A12 | — | 3.8912449E-12 | -2.2935800E-11 |

| | Si (SURFACE NUMBER) | Ri (RADIUS OF CURVATURE) | Di (SURFACE SPACING) | Ndj (REFRACTIVE INDEX) | υdj (ABBE NUMBER) |
|---|---|---|---|---|---|
| | \multicolumn{5}{c}{EXAMPLE 4 · BASIC LENS DATA} | | | | |
| G1 | 1 | 43.6304 | 0.760 | 1.80610 | 33.3 |
| G1 | 2 | 8.3352 | 2.500 | | |
| G1 | 3 | ∞ | 8.200 | 1.71300 | 53.9 |
| G1 | 4 | ∞ | 0.150 | | |
| G1 | *5 | 11.9385 | 2.400 | 1.47136 | 76.6 |
| G1 | *6 | −10.1942 | D6 (VARIABLE) | | |
| G2 | 7 | −20.2228 | 0.550 | 1.77250 | 49.6 |
| G2 | 8 | 6.5959 | 0.300 | | |
| G2 | 9 | 6.4012 | 1.600 | 1.92286 | 18.9 |
| G2 | 10 | 9.1208 | D10 (VARIABLE) | | |
| G3 | *11 | 9.2855 | 1.300 | 1.51007 | 56.2 |
| G3 | *12 | 35.6381 | 0.850 | | |
| | 13 (APERTURE DIAPHRAGM) | — | D13 (VARIABLE) | | |
| G4 | 14 | 6.0323 | 2.100 | 1.71300 | 53.9 |
| G4 | 15 | −12.7458 | 0.590 | 1.68893 | 31.1 |
| G4 | 16 | 5.1783 | 0.200 | | |
| G4 | *17 | 5.6288 | 1.550 | 1.51007 | 56.2 |
| G4 | *18 | 14.1532 | D18 (VARIABLE) | | |
| GC | 19 | ∞ | 0.850 | 1.51680 | 64.2 |
| GC | IMG | ∞ | 0.000 | | |

(* = ASPHERIC SURFACE)
(f = 6.9~19.9mm, FNO. = 3.8~4.5, 2ω = 61.3°~21.0°)

(B)

| EXAMPLE 4 · VARIABLE SURFACE SPACING DATA | | | | |
|---|---|---|---|---|
| | D6 | D10 | D13 | D18 |
| WIDE ANGLE END | 0.47 | 8.95 | 5.20 | 12.42 |
| TELEPHOTO END | 9.24 | 0.19 | 1.95 | 15.67 |

FIG. 13

| EXAMPLE 4 · ASPHERICAL DATA | | | |
|---|---|---|---|
| ASPHERICAL COEFFICIENT | SURFACE NUMBER | | |
| | FIFTH SURFACE | SIXTH SURFACE | ELEVENTH SURFACE |
| KA | 9.2350730E-01 | 9.2388110E-01 | 9.1325170E-01 |
| A3 | -6.6345681E-04 | -6.0187596E-04 | 9.6989873E-04 |
| A4 | 7.3646594E-05 | 2.5234162E-04 | -1.3225968E-04 |
| A5 | -3.3044078E-05 | -1.3070935E-05 | 5.7821877E-06 |
| A6 | 3.6865477E-06 | 5.2029172E-07 | -1.7119165E-06 |
| A7 | -4.1657001E-07 | 4.9970049E-09 | -6.5238430E-08 |
| A8 | 1.0122673E-09 | 5.6923602E-08 | 2.3039219E-06 |
| A9 | -1.1158833E-08 | -1.7028948E-08 | 9.0475334E-10 |
| A10 | -5.1471046E-10 | -4.2895356E-09 | -1.2729155E-07 |
| A11 | -4.4857140E-10 | -2.9074857E-10 | — |
| A12 | 8.0209165E-12 | 8.2860951E-11 | — |
| | TWELFTH SURFACE | SEVENTEENTH SURFACE | EIGHTEENTH SURFACE |
| KA | 9.9914220E-01 | 1.4187280E+00 | 1.1344159E+00 |
| A3 | 9.3617612E-04 | 1.2877652E-04 | 1.9357849E-04 |
| A4 | -7.4559760E-05 | 1.1050731E-03 | 3.1784554E-03 |
| A5 | 5.7996529E-06 | -7.3869183E-05 | -5.2391557E-05 |
| A6 | 3.2554547E-05 | 2.5575847E-05 | 7.4010288E-05 |
| A7 | -7.3867656E-08 | 1.3411768E-07 | -5.0702891E-07 |
| A8 | -2.0199771E-06 | 2.6138782E-06 | 1.0867661E-05 |
| A9 | -5.6498912E-10 | -5.9942157E-10 | 3.9421169E-10 |
| A10 | 1.0928936E-07 | 7.2910081E-08 | 1.8031883E-07 |
| A11 | — | -2.7150235E-11 | -1.7980367E-10 |
| A12 | — | 3.9060732E-12 | -2.2934014E-11 |

| | EXAMPLE 5 · BASIC LENS DATA | | | | |
|---|---|---|---|---|---|
| | Si (SURFACE NUMBER) | Ri (RADIUS OF CURVATURE) | Di (SURFACE SPACING) | Ndj (REFRACTIVE INDEX) | υdj (ABBE NUMBER) |
| G1 | 1 | 83.7472 | 0.760 | 1.80610 | 33.3 |
| | 2 | 8.5340 | 2.500 | | |
| | 3 | ∞ | 8.200 | 1.71300 | 53.9 |
| | 4 | ∞ | 0.150 | | |
| | *5 | 12.5687 | 2.400 | 1.47136 | 76.6 |
| | *6 | −10.0771 | D6 (VARIABLE) | | |
| G2 | 7 | −22.5512 | 0.550 | 1.77250 | 49.6 |
| | 8 | 7.2035 | 0.300 | | |
| | 9 | 6.8688 | 1.600 | 1.92286 | 18.9 |
| | 10 | 9.7888 | D10 (VARIABLE) | | |
| G3 | *11 | 8.2937 | 1.300 | 1.51007 | 56.2 |
| | *12 | 70.2381 | 0.850 | | |
| | 13 (APERTURE DIAPHRAGM) | — | D13 (VARIABLE) | | |
| G4 | 14 | 7.1293 | 2.100 | 1.71300 | 53.9 |
| | 15 | −12.6884 | 0.590 | 1.68893 | 31.1 |
| | 16 | 5.0638 | 0.200 | | |
| | *17 | 5.1501 | 1.550 | 1.51007 | 56.2 |
| | *18 | 12.3073 | D18 (VARIABLE) | | |
| GC | 19 | ∞ | 0.850 | 1.51680 | 64.2 |
| | IMG | ∞ | 0.000 | | |

(* = ASPHERIC SURFACE)
(f = 6.7~19.1mm, FNO. = 3.9~4.5, 2ω = 62.8°~22.0°)

(B)

| EXAMPLE 5 · VARIABLE SURFACE SPACING DATA | | | | |
|---|---|---|---|---|
| | D6 | D10 | D13 | D18 |
| WIDE ANGLE END | 0.47 | 10.94 | 5.20 | 11.26 |
| TELEPHOTO END | 10.65 | 0.76 | 1.92 | 14.54 |

FIG. 15

| EXAMPLE 5 - ASPHERICAL DATA | | | |
|---|---|---|---|
| ASPHERICAL COEFFICIENT | SURFACE NUMBER | | |
| | FIFTH SURFACE | SIXTH SURFACE | ELEVENTH SURFACE |
| KA | 9.2780450E-01 | 9.1463020E-01 | 9.0804020E-01 |
| A3 | -5.6101292E-04 | -4.2172464E-04 | 7.3794553E-04 |
| A4 | 9.9545791E-05 | 2.5886167E-04 | -1.3871596E-04 |
| A5 | -3.2652859E-05 | -1.5705334E-05 | 5.2135992E-06 |
| A6 | 3.6802400E-06 | 7.8016062E-07 | -1.7521327E-06 |
| A7 | -4.1381140E-07 | 2.1653346E-08 | -6.7053499E-08 |
| A8 | 1.5634573E-09 | 5.7732592E-08 | 2.3038343E-06 |
| A9 | -1.1118701E-08 | -1.6993412E-08 | 9.0229107E-10 |
| A10 | -5.1547536E-10 | -4.2850573E-09 | -1.2729158E-07 |
| A11 | -4.4884452E-10 | -2.9041769E-10 | — |
| A12 | 7.7495129E-12 | 8.2518056E-11 | — |
| | TWELFTH SURFACE | SEVENTEENTH SURFACE | EIGHTEENTH SURFACE |
| KA | 9.9920880E-01 | 1.4903366E+00 | 1.1309248E+00 |
| A3 | 8.2058637E-04 | 1.2470344E-04 | -1.8399923E-04 |
| A4 | -7.3511519E-05 | 1.1053506E-03 | 3.1561461E-03 |
| A5 | 6.2386452E-06 | -7.3013468E-05 | -5.3699456E-05 |
| A6 | 3.2594882E-05 | 2.5672940E-05 | 7.3920046E-05 |
| A7 | -7.1543661E-08 | 1.3995065E-07 | -5.1144236E-07 |
| A8 | -2.0198331E-06 | 2.6142464E-06 | 1.0867416E-05 |
| A9 | -5.5819757E-10 | -5.8351502E-10 | 3.8410780E-10 |
| A10 | 1.0928958E-07 | 7.2910758E-08 | 1.8031847E-07 |
| A11 | — | -2.7138417E-11 | -1.7982641E-10 |
| A12 | — | 3.9076568E-12 | -2.2934707E-11 |

*FIG. 16*

|  | VALUE RELATING TO CONDITIONAL EXPRESSION | | | | |
|---|---|---|---|---|---|
|  | f2/ft | f4/ft | $\nu$d1 | RN | RP |
| EXAMPLE 1 | −0.49 | 1.17 | 33.3 | 7.4995 | 6.7251 |
| EXAMPLE 2 | −0.51 | 1.32 | 33.3 | 7.4331 | 6.7236 |
| EXAMPLE 3 | −0.49 | 1.10 | 31.3 | 7.1728 | 6.6871 |
| EXAMPLE 4 | −0.45 | 0.85 | 33.3 | 6.5959 | 6.4012 |
| EXAMPLE 5 | −0.52 | 1.36 | 33.3 | 7.2035 | 6.8688 |

EXAMPLE 5 · WIDE ANGLE END

EXAMPLE 5 · TELEPHOTO END

ZOOM LENS AND IMAGING APPARATUS

This application is based on and claims priority under 35 U.S.C §119 from Japanese Patent Application No. 2007-190729, filed on Jul. 23, 2007, the entire disclosure of which is herein incorporated by reference.

BACKGROUND OF THE INVENTION

1. Field of the Invention

The present invention relates to a zoom lens and an imaging apparatus suitably used in a small-sized apparatus having an imaging function, particularly, a video camera, a digital still camera, a portable telephone with a camera, and a personal digital assistance (PDA) or the like.

2. Description of Related Art

In recent years, in an imaging apparatus of a digital still camera or the like, in accordance with a progress of downsizing an imaging apparatus such as CCD. (Charge Coupled Device) and CMOS (Complementary Metal Oxide Semiconductor). Further downsizing is requested for the apparatus as a whole. Hence, in recent times, there is developed a thin zoom lens when integrated to an imaging apparatus by constituting a so-to-speak bending-type optical system by bending an optical path of a lens system at a middle thereof.

As a zoom lens using a bending-type optical system, JP-A-2000-131610 and JP-A-2006-267862 each discloses a zoom lens of a four-group configuration including in order from the object side a first lens group having a positive refractive power, a second lens group having a negative refractive power, a third lens group having a positive refractive power, and a fourth lens group having a positive refractive power and changing a magnification by moving the negative second lens group and the positive fourth lens group. Further, JP-A-2004-354869 discloses a zoom lens of a five-group configuration including in order from the object side a first lens group having a positive refractive power, a second lens group having a negative refractive power, a third lens group having a positive refractive power, a fourth lens group having a positive refractive power, and a fifth lens group having a negative refractive power and changing a magnification by moving the negative second lens group and the positive fourth lens group. According to the zoom lenses described in these references, by arranging a prism at inside of the first lens group, an optical path is bended substantially by 90°. Further, there is disclosed an example constituted by a total of 3 lenses including one negative lens and a cemented lens having a second lens group.

As described above, by using the bending-type optical system, reducing the thickness of a zoom lens when integrated to an imaging apparatus can be achieved, and therefore, in recent years, the zoom lens is started to be mounted to various imaging apparatus. On the other hand, in the market there is also a request for being low in cost as well as reducing the thickness. Therefore, there is desired a development of a bending-type optical system having a constitution advantageous in view of cost while achieving reducing the thickness. In order to achieve reducing the thickness and being low in cost, it is conceivable to reduce a number of lenses by maintaining a performance in view of cost while achieving reducing the thickness. JP-A-2000-131610 discloses an example in which the second lens group includes 3 lenses, however, when the number of lenses can be further reduced.

SUMMARY OF THE INVENTION

An object of an illustrative, non-limiting example of the invention is to provide a zoom lens and an imaging apparatus, which are downsized and are low in cost while maintaining an excellent optical performance.

According to an aspect of the invention, there is a zoom lens including: a first lens group; a second lens group; a third lens group; and a fourth lens group in order from the object side and changing a magnification by moving the second lens group and the fourth lens group. The first lens group has a positive power as a whole and includes in order from the object side a negative lens, a reflecting member of bending an optical path by substantially 90°, and a positive lens having biconvex shape at least one surface of which is an aspherical surface; the second lens group has a negative power as a whole and includes two lenses; the third lens group includes a positive power as a whole; and the fourth lens group has a positive power as a whole and includes in order from the object side a cemented lens having a negative power and a positive lens having a meniscus shape at least one surface of which is an aspherical surface and an object-side surface of which is convex. The zoom lens satisfies conditional equations as follows. In the equations, notation f2 designates a focal length of the second lens group, f4 designates a focal length of the fourth lens group, ft designates a focal length at a telephoto end of the entire system (the zoom lens), and vd1 designates an Abbe number at the d-line of a negative lens on the most object side of the first lens group.

$$-0.6 < f2/ft < -0.3 \quad (1)$$

$$0.8 < f4/ft < 1.5 \quad (2)$$

$$30 < vd1 \quad (3)$$

According to the zoom lens, by constituting a bending-type optical system of bending the optical path by the reflecting member arranged at inside of the first lens group, a length in a thickness direction of the optical system is restrained while maintaining an excellent optical performance and reducing the thickness when integrated to an imaging apparatus is facilitated. Further, whereas cost becomes low by reducing a number of lenses more than that in the background art by constituting the second lens group by two lenses, the excellent optical performance is maintained by achieving to optimize constitutions of the respective lens groups.

Further, by pertinently adopting following constitutions to satisfy, the optical performance can further be improved, which is advantageous for lowering cost.

In the zoom lens, the two lenses of the second lens group may be a negative lens having a biconcave shape and a positive lens having a meniscus shape an object-side surface of which is convex, in order from the object side. Further, the second lens group may satisfy a conditional equation as follows. In the equation, RN designates a radius of curvature of an image-side surface of the negative lens in the second lens group, RP designates a radius of curvature of an object-side surface of the positive meniscus lens in the second lens group.

$$|RN| > |RP| \quad (4)$$

Further, it is possible that the third lens group consists of one positive lens made of a resin material and having at least one aspherical surface.

In this case, fabrication is facilitated more than an aspherical lens of glass, which is advantageous for lowering cost while achieving high performance formation. Further, reduction in weight is also achieved by constituting one resin lens.

According to an aspect of the invention, there is provided including: the zoom lens; and an imaging element that outputs an imaging signal in accordance with an optical image formed by the zoom lens.

According to the imaging apparatus, downsizing and lowering cost in the apparatus as a whole as the imaging lens are achieved by using the zoom lens of the high performance achieving downsizing and lowering cost.

BRIEF DESCRIPTION OF THE DRAWINGS

The features of the invention will appear more fully upon consideration of the exemplary example of the invention, which are schematically set forth in the drawings, in which:

FIG. 6 illustrates diagrams showing lens data of the zoom lens according to Example 1, (A) shows basic lens data, (B) shows data of on-axis surface spacings of portions moved in accordance with changing a magnification;

FIG. 7 is a diagram showing data with regard to aspherical surfaces of the zoom lens according to Example 1;

FIG. 8 illustrates diagrams showing lens data of the zoom lens according to Example 2, (A) shows basic lens data, (B) shows data of on-axis surface spacings of portions moved in accordance with changing a magnification;

FIG. 9 is a diagram showing data with regard to aspherical surfaces of the zoom lens according to Example 2.

FIG. 10 illustrates diagrams showing lens data of the zoom lens according to Example 3, (A) shows basic lens data, (B) shows data of on-axis surface spacings of portions moved in accordance with changing a magnification;

FIG. 11 is a diagram showing data with regard to aspherical surfaces of the zoom lens according to Example 3;

FIG. 12 illustrates diagrams showing lens data of the zoom lens according to Example 4, (A) shows basic lens data, (B) shows data of on-axis surface spacings of portions moved in accordance with changing a magnification;

FIG. 13 is a diagram showing data with regard to aspherical surfaces of the zoom lens according to Example 4;

FIG. 14 illustrates diagrams showing lens data of the zoom lens according to Example 5, (A) shows basic lens data, (B) shows data of on-axis surface spacings of portions moved in accordance with changing a magnification;

FIG. 15 is a diagram showing data with regard to aspherical surfaces of the zoom lens according to Example 5;

FIG. 16 is a diagram showing values with regard to conditional equations summarized for the respective examples;

DETAILED DESCRIPTION OF THE EXEMPLARY EMBODIMENTS

In a zoom lens according to an exemplary embodiment of the invention, a constitution having an advantageous in downsizing is constructed as the bending-type optical system, the respective lens groups are optimized by the number of lenses smaller than that in the background art, and therefore, reducing cost can be achieved while maintaining the excellent optical performance by the downsizing.

Further, in an imaging apparatus according to an exemplary embodiment of the invention, the zoom lens having a high performance and achieving downsizing and reducing cost is used as an imaging lens, and therefore, downsizing and reducing cost of the apparatus as a whole can be achieved while maintaining the excellent imaging performance.

Exemplary embodiments of the invention will be explained in details in reference to the drawings as follows.

Figure 5:
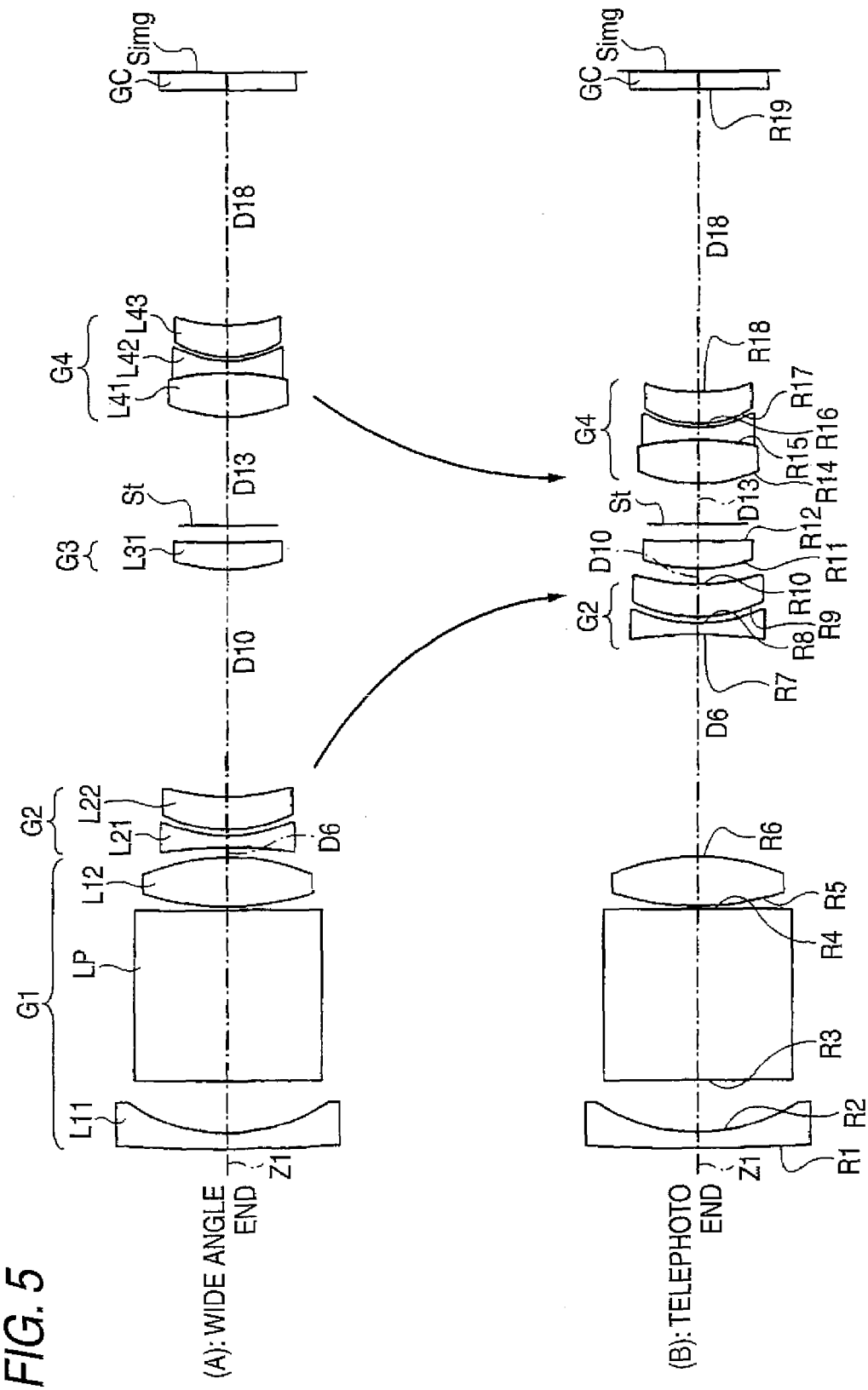
FIG. 5 is a lens sectional view in correspondence with Example 5, showing a fifth constitution example of a zoom lens according to an exemplary embodiment of the invention.

FIGS. 1(A), (B) show a first constitution example of a zoom lens according to an exemplary embodiment of the invention. The constitution example corresponds to a lens constitution of a first numerical value example (FIG. 6(A), FIG. 6(B) and FIG. 7 mentioned later). Further, FIG. 1(A) corresponds to an optical system arrangement at a wide-angle end (shortest focal length state) and FIG. 1(B) corresponds to an optical system arrangement at a telephoto end (longest focal length state). Similarly, FIGS. 2(A), (B) through FIGS. 5(A), (B) show section constitutions of second through fifth constitution examples corresponding to lens constitutions of second through fifth numerical value examples. In FIGS. 1(A), (B) through FIGS. 5(A), (B), notation Ri designates a radius of curvature of an i-th surface attaching the notation such that a surface of a constituent element for the most object side is defined as 1-th and the notation is successively increased in accordance with proceeding to an image side (focus side). Notation Di designates an on-axis surface spacing on an optical axis Z1 between an i-th surface and an (i+1)-th surface. Further, with regard to notation Di, the notations are attached only to on-axis surface spacings D6, D10, D13, D18 of the portions changed in accordance with changing a magnification. Further, basic constitutions of respective constitution examples are the same, and therefore, an explanation will be given based on the first constitution example shown in FIGS. 1(A), (B) as follows.

The zoom lens is used by being mounted to a small-sized apparatus having an imaging function, for example, a digital still camera (FIG. 28, FIG. 29) or a video camera, a portable telephone with a camera, and PDA or the like. The zoom lens includes a first lens group G1, a second lens group G2, a third lens group G3, an aperture diaphragm St for adjusting a light amount, and a fourth lens group G4 in order from the object side.

An image formation surface Simg of the zoom lens is arranged with an imaging device, not illustrated, of CCD or the like. The imaging device outputs an imaging signal in accordance with an optical image formed by the zoom lens. At least, an imaging apparatus according to this embodiment is constituted by the zoom lens and the imaging element. Various optical members GC may be arranged between the fourth lens group G4 and the imaging device in accordance with a constitution of a side of a camera mounted with the lens. For example, an optical member in a flat plate shape of a cover glass for protecting an imaging surface or an infrared ray cut filter or the like may be arranged.

The zoom lens is adapted to change a magnification by changing intervals for the respective groups. Further in details, the first lens group G1 and the third lens group G3 are normally fixed in changing a magnification, the second lens group G2 and the fourth lens group G4 are adapted to move on the optical axis Z1 in changing the magnification. According to the zoom lens, in accordance with changing the magnification from the wide-angle end to the telephoto end, the respective moving groups are moved to draw loci shown by bold lines in the drawings from a state of FIG. 1(A) to a state of FIG. 1(B). In this case, the second lens group G2 is mainly assigned with magnification changing operation and the fourth group G4 is assigned with operation of correcting a variation in an image surface in accordance with changing the magnification.

The zoom lens may include resin lenses in the respective lens groups as necessary. Further, aspherical lenses may be used in the respective lens groups as necessary. In a case of being constituted by an aspherical lens, when molded by using a resin material, a workability is excellent and reducing cost is achieved, and therefore, an aspherical lens may be a resin lens. Particularly, as described later, aspherical lenses made of a resin material may be used in the third lens group G3 and the fourth lens group G4.

The first lens group G1 has a positive power as a whole. The first lens group G1 includes a negative lens, a reflecting member for bending an optical path by substantially 90°, and a positive lens in which at least one surface is an aspherical lens, in order from the object side. Further specifically, as shown by FIGS. 1(A), (B), the first lens group G1 includes, for example, a negative meniscus lens L11 directing a convex surface toward the object side, a right angle prism LP constituting a reflecting member, and a positive lens L12 having a biconvex shape.

Figure 27:
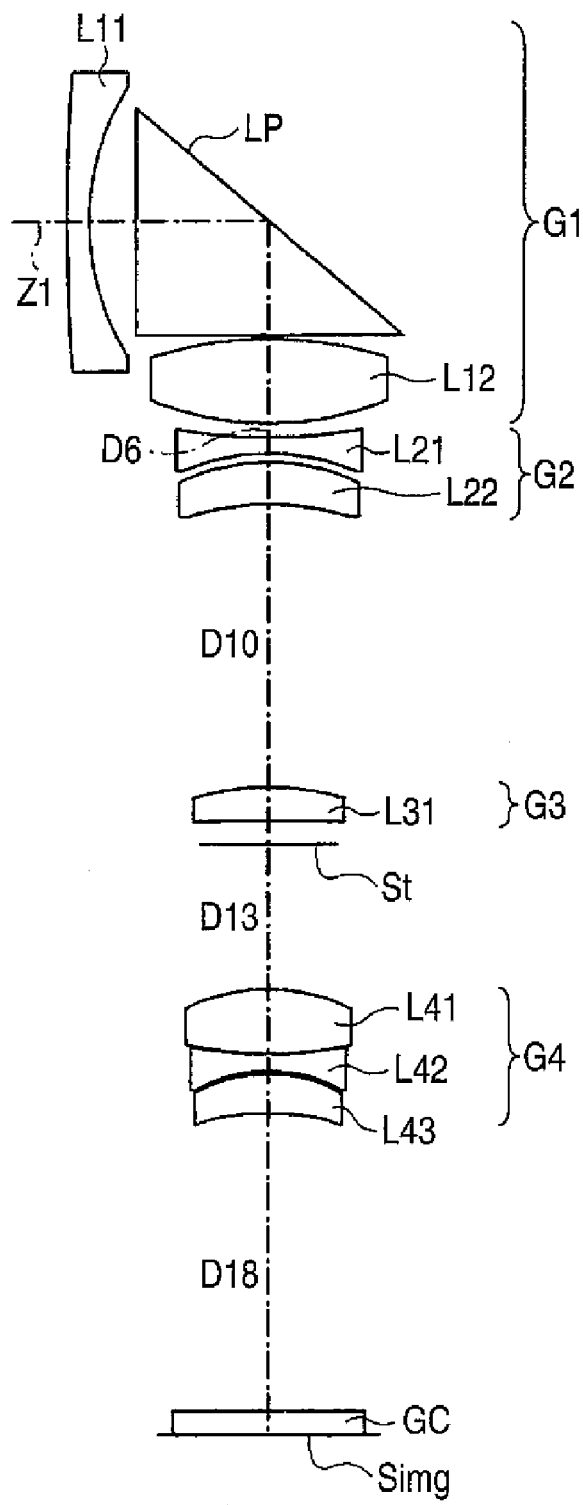
FIG. 27 is an explanatory view of a bending-type optical system.

Further, the zoom lens according to this embodiment is a bending-type optical system, actually, as shown by FIG. 27, in the first lens group G1, the optical path is bended by substantially 90° by an inner reflecting surface of the right angle prism LP. In FIGS. 1(A), (B) through FIGS. 5(A), (B), the inner reflecting surface of the prism LP is omitted and the prism LP is shown by being developed in the same direction on the optical axis Z1. Further, in place of the right angle prism LP, other reflecting member of a reflecting mirror or the like may be used.

The second lens group G2 is constituted by two lenses, and has a negative power as a whole. Further specifically, as shown by FIGS. 1(A), (B), the second lens group G2 is constituted by, for example, a negative lens L21 having a biconcave shape, and a positive meniscus lens L22 having a concave surface on the object side, in order from the object side.

The third lens group G3 has a positive power as a whole. Further specifically, as shown by FIGS. 1(A), (B), the third lens group G3 is constituted by, for example, one positive lens L31 having a concave surface on the object side. The positive lens L31 may be an aspherical lens of a resin material in which at least one surface thereof is an aspherical surface.

The fourth lens group G4 has a positive power as a whole. Further specifically, as shown by FIGS. 1(A), (B), the fourth lens group G4 is a cemented lens including two lenses L41 and L42 and having a negative power, and a positive meniscus lens L43 having a concave surface on the object side, in order from the object side. The positive meniscus lens L43 may be an aspherical lens made of a resin material in which at least one surface thereof is an aspherical surface.

The zoom lens satisfies conditional equations as follows. In the equations, notation f2 designates a total length of the second lens group G1, notation f4 designates a focal length of the fourth lens group G4, notation ft designates a focal length at a telephoto end of the entire system, notation vd1 designates an Abbe number at the d-line of a negative lens on the most object side of the first lens group G1 (negative meniscus lens L11).

$$-0.6 < f2/ft < -0.3 \tag{1}$$

$$0.8 < f4/ft < 1.5 \tag{2}$$

$$30 < vd1 \tag{3}$$

The zoom lens may further satisfy a conditional equation as follows. In the equation, notation RN designates a radius of curvature of an image-side surface of the negative lens L21 in the second lens group G2, and notation RP designates a radius of curvature of an object-side surface of the positive meniscus lens L22 in the second lens group G2.

$$|RN| > |RP| \tag{4}$$

Figure 28:
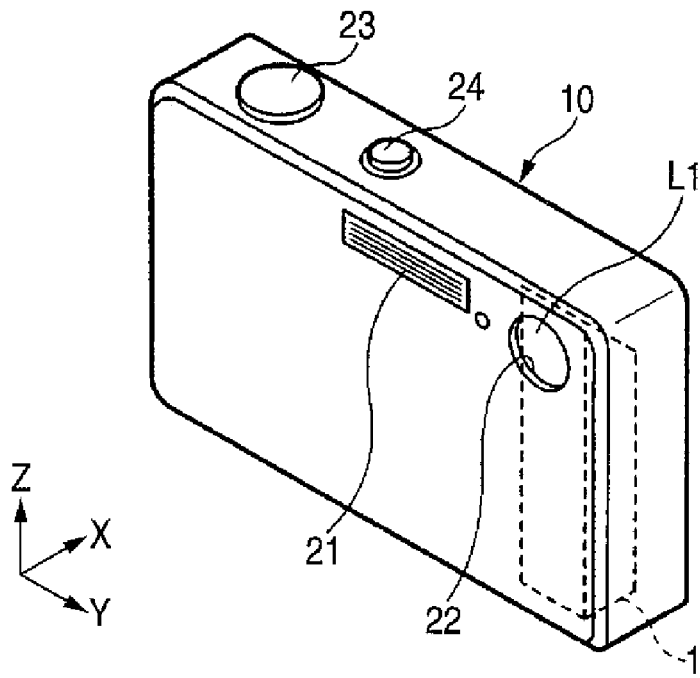
FIG. 28 is a front side appearance view showing a digital camera as an imaging apparatus according to an exemplary of the invention.
Figure 29:
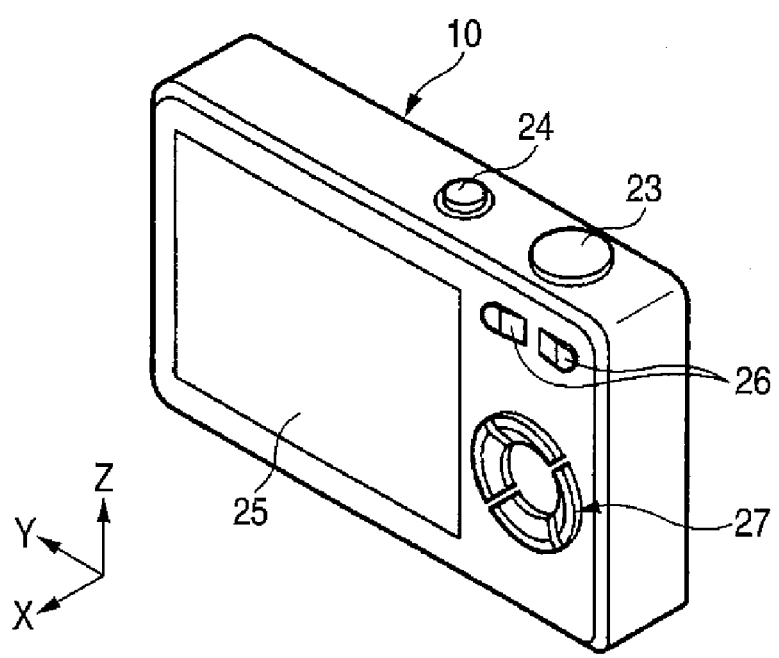
FIG. 29 is a back side appearance view showing the digital camera as the imaging apparatus according to the example of the invention.

FIG. 28 and FIG. 29 show a digital still camera as an example of an imaging apparatus mounted with the zoom lens. FIG. 28 shows an appearance viewing the digital still camera 10 from a front side, FIG. 29 shows an appearance viewed from a back side of the digital still camera 10. The digital still camera 10 includes an electronic flash generating portion 21 for irradiating electronic flash at an upper portion of a center of a front side. A side portion of the electronic flash generating portion 21 is provided with an imaging opening 22 on which light from an imaging object is incident. The digital still camera 10 further includes a release button 23 and a power source button 24 on an upper surface side. The digital still camera 10 further includes a display portion 25 and operating portions 26 and 27 on a back side. The display portion 25 is for displaying a taken image. According to the digital still camera 10, one frame of a still picture is taken by depressing to operate the release button 23 and an image data taken by the imaging is recorded to a memory card (not illustrated) mounted to the digital still camera 10.

The digital still camera 10 includes an imaging lens 1 at inside of a cabinet. The zoom lens according to this embodiment is used as the imaging lens 1. The imaging lens 1 is arranged such that the lens on the most object side (negative meniscus lens L11) is disposed at the imaging opening 22 provided at a front side. The imaging lens 1 is integrated in a vertical direction as a whole at inside of the digital still camera 10 such that the optical axis Z1 after bended by the right angle prism LP coincides with a vertical direction of the camera body. Further, the imaging lens 1 may be integrated in a horizontal direction as a whole at inside of the digital still camera 10 such that the optical axis Z1 after bended constitutes a horizontal direction of the camera body.

Further, the zoom lens according to this embodiment is not limited to a digital still camera but can be mounted to various information apparatus (PDA and the like) having an imaging function or a video camera.

Next, operation and effect of the zoom lens constituted as described above will be explained.

According to the zoom lens, by constituting the bending-type optical system for bending the optical path by the reflecting member arranged at inside of the first lens group G1, a length in a thickness direction of the optical system is restrained while maintaining an excellent optical performance and reducing the thickness in being integrated to an imaging apparatus is facilitated. Further, whereas reducing cost is achieved by reducing a number of lenses more than that of the background art by constituting the second lens group G2 by two lenses, the excellent optical performance is maintained by achieving an optimization of constitutions of the respective lens groups. Further, by using aspherical lenses in the respective lens groups as necessary, the zoom lens is advantageous for correcting aberrations. In that case, by constituting the aspherical lens by a resin lens, fabrication thereof is facilitated in comparison with an aspherical lens of glass, and reducing cost can be achieved while achieving high performance formation. Further, reducing the weight can be achieved by constituting the resin lens.

The conditional equation (1) relates to a power of the second lens group G2, when the upper limit is exceeded, the power of the second lens group G2 becomes excessively large, a sensitivity of an error (an influence of a fabrication error relative to a design value effected on the optical performance) becomes excessively high, which is not preferable. Further, when lower than a lower limit, an amount of moving the second lens group G2 becomes excessively large in changing a magnification and the lens system becomes large, and therefore, the condition is not preferable.

The conditional equation (2) relates to a power of the fourth lens group G4, when below a lower limit, the power of the fourth lens group G4 becomes excessively large, and a sensitivity of an error becomes excessively high, which is not preferable. Further, when an upper limit is exceeded, an amount of moving the fourth lens group G4 in changing a magnification becomes excessively large, the lens system becomes large, and therefore, the condition is not preferable.

The conditional equation (3) relates to an Abbe number of the negative meniscus lens L11 on the most object side of the first lens group G1. By making the Abbe number larger than 30, an amount of a chromatic aberration generated by an integrating error at inside of the first lens group G1 can be reduced.

The conditional equation (4) relates to a shape of a surface of a lens at inside of the second lens group G2, and when out of a numerical value range, correction of an aberration of a curvature of field or the like becomes difficult.

As has been explained above, in the zoom lens according to this embodiment, a constitution advantageous in downsizing is constructed as the bending-type optical system, an optimization of the respective lens groups is achieved by a number of lenses smaller than that of the background art, and therefore, a zoom optical system achieving reducing cost can be realized while maintaining the small-sized and the excellent optical function.

EXAMPLES

Next, an explanation will be given of specific numerical value examples of the zoom lens according to the example. In the following, a first through a fifth numerical value example will be explained summarizingly.

Figure 1:
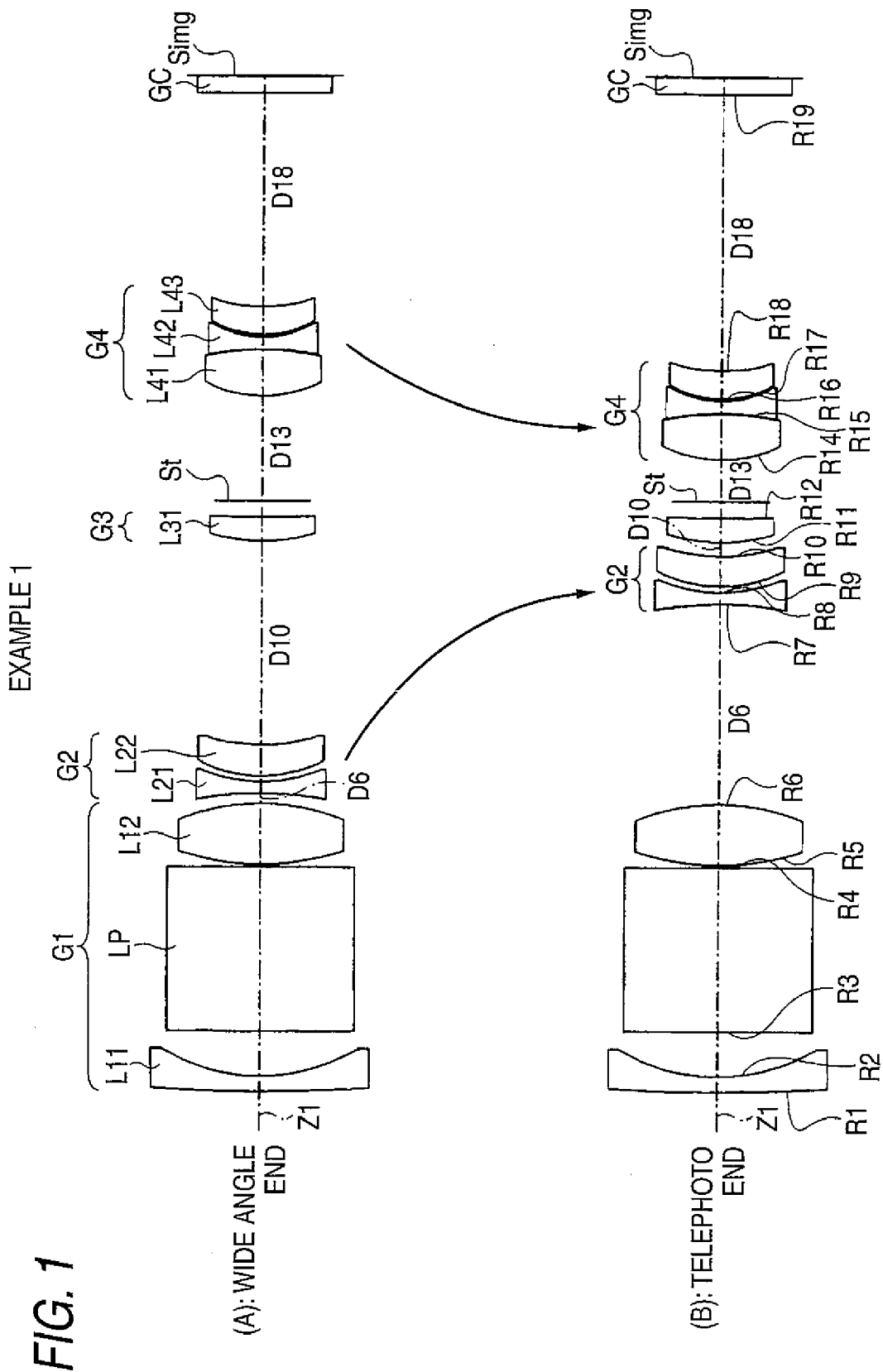
FIG. 1 is a lens sectional view in correspondence with Example 1, showing a first constitution example of a zoom lens according to an exemplary embodiment of the invention.

FIGS. 6(A), (B) and FIG. 7 show specific lens data in correspondence with the constitution of the zoom lens shown in FIGS. 1(A), (B). Particularly, FIG. 6(A) shows basic lens data thereof, and FIG. 6(B) and FIG. 7 show other data. A column of a surface number Si in the lens data shown in FIG. 6(A), a number of an i-th (i=1 through 19) surface is shown by attaching the notation such that a surface of a constituent element on the most object side is constituted by 1-th and the notation is successively increased in accordance with proceeding to the image side. A column of the radius of curvature Ri shows a value (mm) of a radius of a curvature of an i-th surface on an object side in correspondence with notation Ri attached in FIG. 1. Also a column of an on-axis surface spacing Di shows a spacing (mm) on the optical axis between an i-th surface Si and an (i+1)-th surface Si+1 from the object side similarly. A column of Ndj shows a value of a refractive index at the d-line (587.6 nm) of a j-th optical element from the object side. A column of vdj shows a value of an Abbe number at the d-line of the j-th optical element from the object side. FIG. 6(A) further shows values of near axis focal lengths f (mm) of a total system at a wide-angle end and a telephoto end, a field angle (2ω) and F number (FNO.) as various data.

In the zoom lens according to Example 1, the lens L31 of the third lens group G3 and the lens L43 of the most image side in the fourth lens group G4 are constituted by resin lenses.

In the zoom lens according to Example 1, the second lens group G2 and the fourth lens group G4 are moved on the optical axis in accordance with changing a magnification, and therefore, values of on-axis surface spacings D6, D10, D13, D18 of frontward and rearward from the respective groups become variable. FIG. 6(B) shows values at the wide-angle end and telephoto end as data in changing the magnification of the on-axis surface spacings D6, D10, D13, D18.

In the lens data of FIG. 6(A), a sign '*' attached to a left side of the surface number shows that the lens surface is constituted by an aspherical shape. In the zoom lens according to Example 1, all of both surfaces S5 and S6 of the lens L12 in the first lens group G1, both surfaces S11 and S12 of the lens L31 of the third lens group G3, and both surfaces S17 and S18 of the lens L43 in the fourth lens group G4 are constituted by aspherical shapes. The basic lens data of FIG. 6(A) shows numerical values of radii of curvature at a vicinity of the optical axis as radii of curvature of the aspherical surfaces.

FIG. 7 shows aspherical surface data of the zoom lens according to Example 1. In a numerical value shown as an aspherical surface data, sign "E" shows that a numerical value successive thereto is "exponent" constituting a base by 10, and shows that the numerical value expressed by the exponential function constituting the base by 10 is multiplied by a numerical value frontward from "E". For example, when '1.0E-02', it shows '1.0×10$^{-2}$'.

As aspherical surface data of the zoom lens according to Example 1, values of respective coefficients $A_n$, KA in an equation of the spherical shape expressed by equation (A) as follows are described. Further in details, notation Z designates a length (mm) of a perpendicular drawn from a point of an aspherical surface disposed at a position of the height h from the optical axis to a contact surface of an apex of the aspherical surface (plane orthogonal to the optical axis).

$$Z = C \cdot h^2 / \{1 + (1 - KA \cdot C^2 \cdot h^2)^{1/2}\} + \Sigma A_n \cdot h^n \quad (A)$$

(n=an integer equal to or larger than 3)

where,

Z: depth of aspherical surface (mm)

h: distance (height) from an optical axis to lens surface (mm)

KA: eccentricity

C: near axis curvature=1/R (R: near axis radius of curvature)

$A_n$: n-th order aspherical coefficient

The zoom lens according to Example 1 is expressed by pertinently effectively using order numbers of $A_3$ through $A_{12}$ as aspherical coefficients $A_n$.

Figure 2:
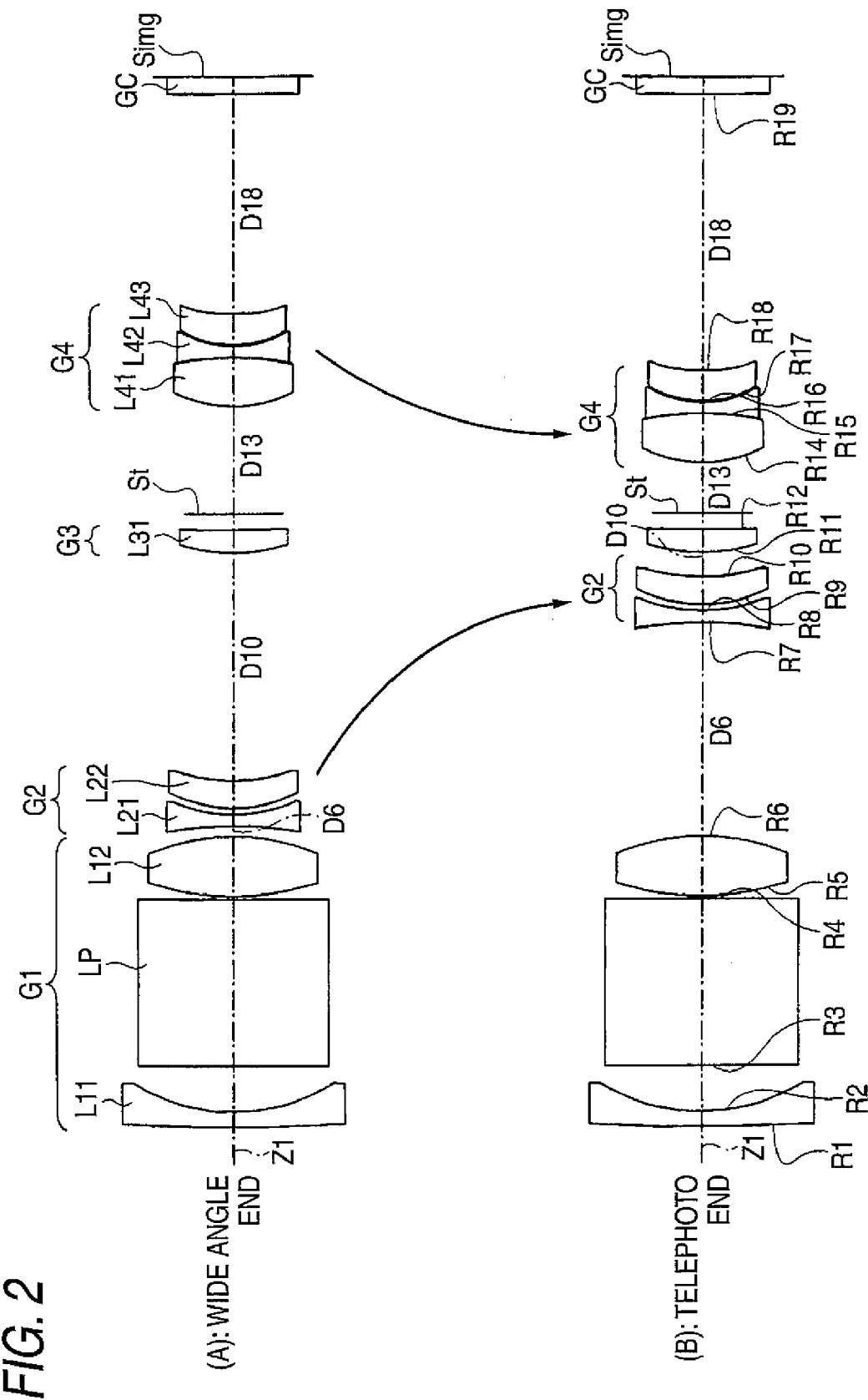
FIG. 2 is a lens sectional view in correspondence with Example 2, showing a second constitution example of a zoom lens according to an exemplary embodiment of the invention;.
Figure 3:
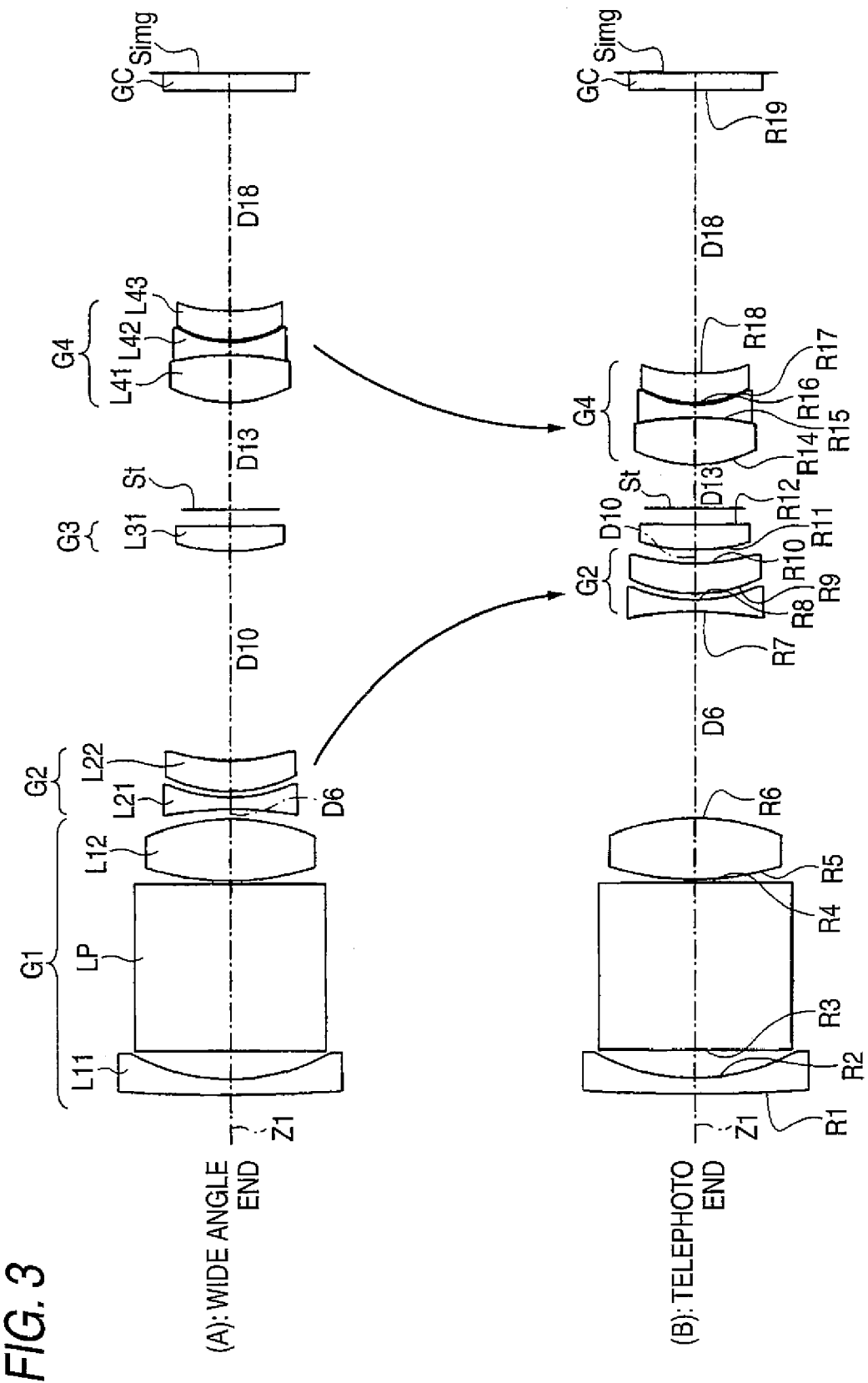
FIG. 3 is a lens sectional view in correspondence with Example 3, showing a third constitution example of a zoom lens according to an exemplary embodiment of the invention.
Figure 4:
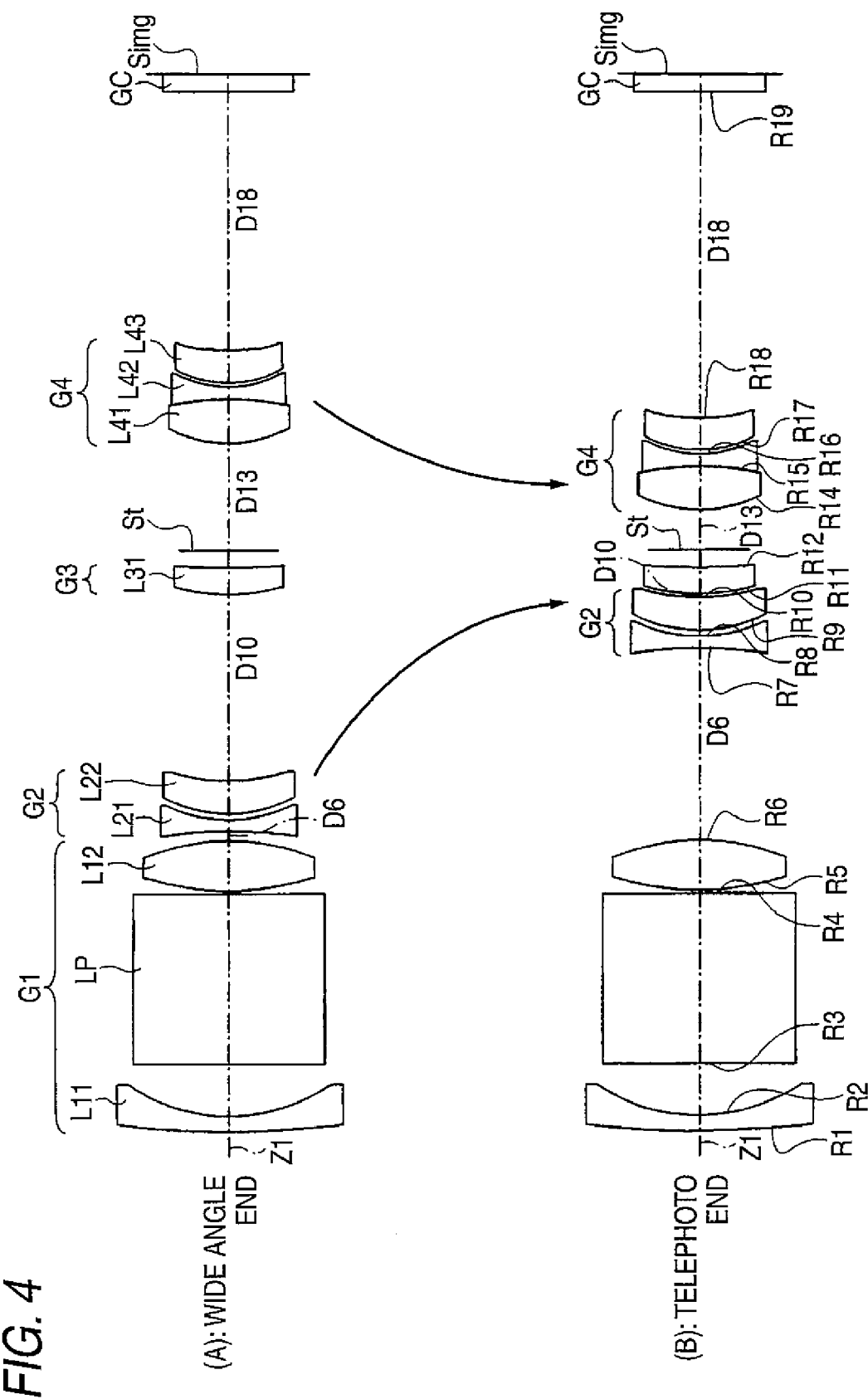
FIG. 4 is a lens sectional view in correspondence with Example 4, showing a fourth constitution example of a zoom lens according to an exemplary embodiment of the invention.

Similar to the zoom lens according to Example 1 mentioned above, specific lens data in correspondence with a constitution of a zoom lens shown in FIGS. 2(A), (B) are shown in FIG. 8(A), FIG. 8(B) and FIG. 9 as Example 2. Further, similarly, specific lens data in correspondence with a constitution of a zoom lens shown in FIGS. 3(A), (B) are shown in FIG. 10(A), FIG. 10(B) and FIG. 11 as Example 3. Further, similarly, specific lens data in correspondence with a constitution of the zoom lens shown in FIGS. 4(A), (B) are shown in FIG. 12(A), FIG. 12(B) and FIG. 13 as Example 4. Further, similarly, specific lens data in correspondence with a constitution of a zoom lens shown in FIGS. 5(A), (B) are shown in FIG. 14(A), FIG. 14(B) and FIG. 15 as Example 5.

Further, also in any of the zoom kens of Examples 2 through 5, surfaces similar to those of the zoom lens according to Example 1 are constituted by aspherical shapes. Further, in the zoom lenses of Example 2, Example 3, and Example 5, similar to the zoom lens according to Example 1, the lens L31 of the third lens group G3 and the lens L43 of the most image side in the fourth lens group G4 are constituted by resin lenses.

FIG. 16 shows values with regard to the above-described respective conditional equations summarized for the respective examples. As is known from FIG. 16, the respective conditional equations are satisfied in the respective examples.

Figure 17:
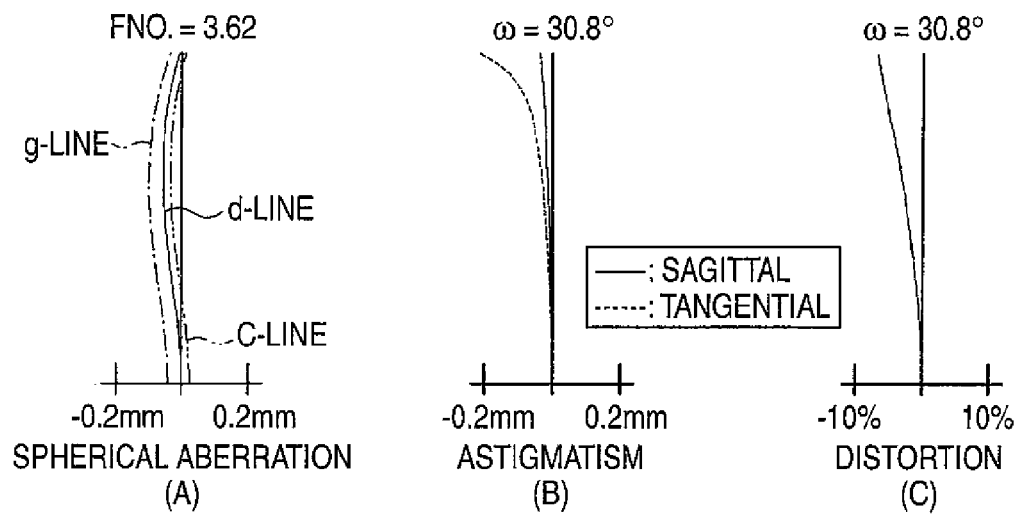
FIG. 17 are aberration diagrams showing various aberrations at the wide-angle end of the zoom lens according to Example 1, (A) shows aspherical aberration, (B) shows astigmatism, and (C) shows distortion.
Figure 18:
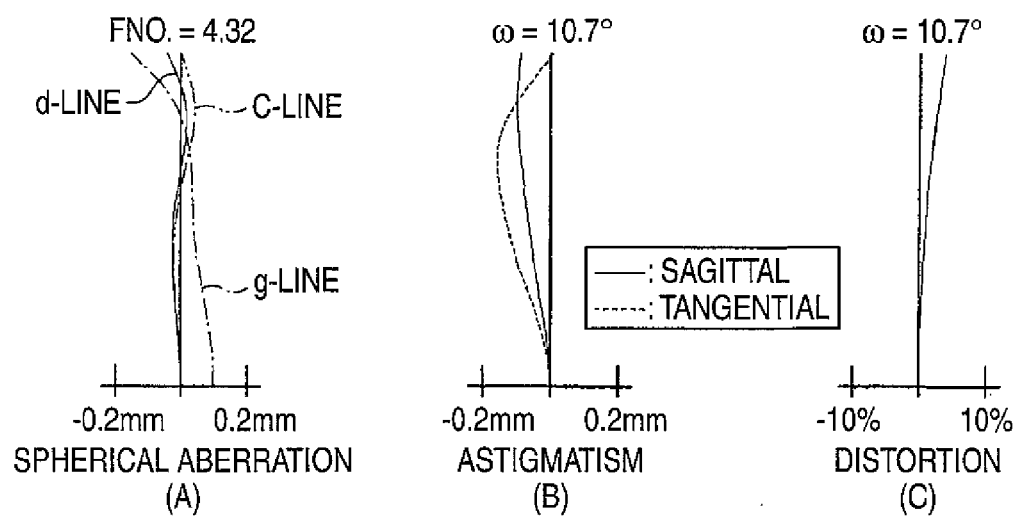
FIG. 18 are aberration diagrams showing various aberrations at the telephoto end of the zoom lens according to Example 1, (A) shows aspherical aberration, (B) shows astigmatism, and (C) shows distortion.

FIG. 17(A) through FIG. 17(C) respectively show spherical aberrations, astigmatism, and distortions at the wide-angle end of the zoom lens according to example 1. FIG. 18(A) through FIG. 18(C) show similar respective aberrations at the telephoto end. The respective aberration diagrams show aberrations constituting a reference wavelength at the d-line (587.6 nm). The spherical aberration diagrams also show aberrations at the g-line (wavelength 435.8 nm), C-line (wavelength 656.3 nm). In the aspherical aberration diagram, a bold line designates the aberration in sagittal direction, and a broken line designates the aberration in tangential direction. Notation FNO. designates F value and notation ω designates a half angle of view.

Figure 19:
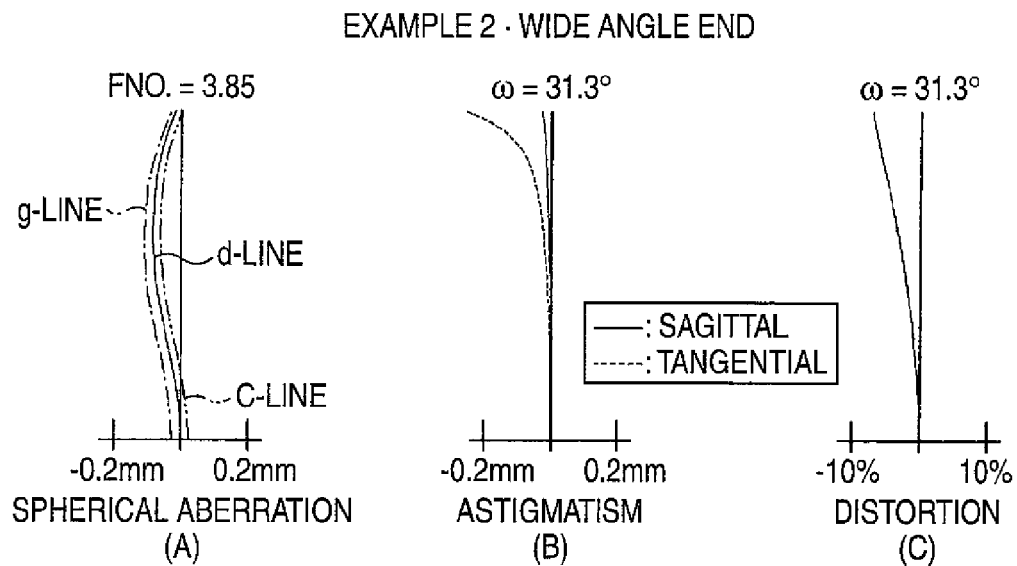
FIG. 19 are aberration diagrams showing various aberrations at the wide-angle end of the zoom lens according to Example 2, (A) shows aspherical aberration, (B) shows astigmatism, and (C) shows distortion.
Figure 20:
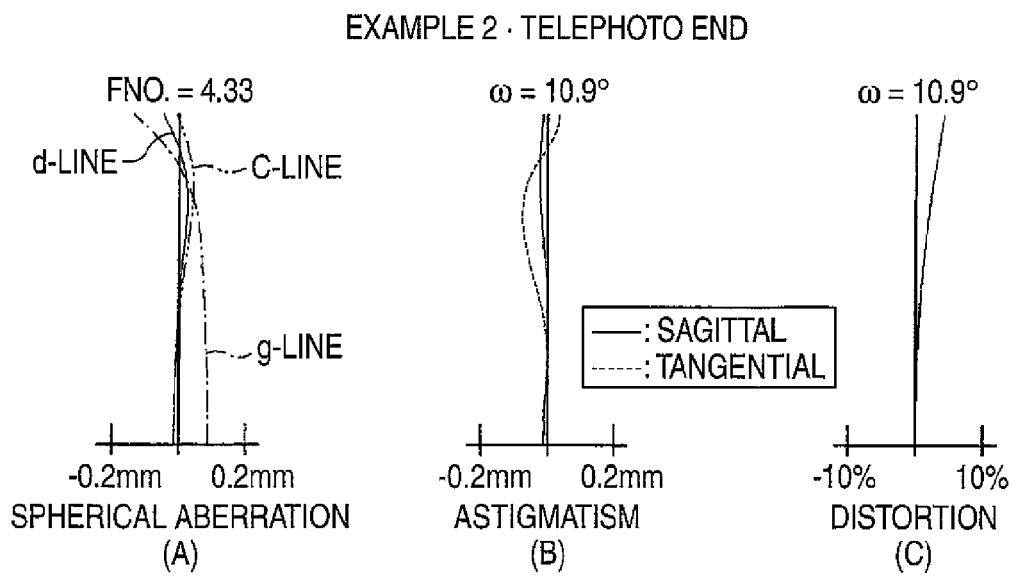
FIG. 20 are aberration diagrams showing various aberrations at the telephoto end of the zoom lens according to Example 2, (A) shows aspherical aberration, (B) shows astigmatism, and (C) shows distortion.
Figure 21:
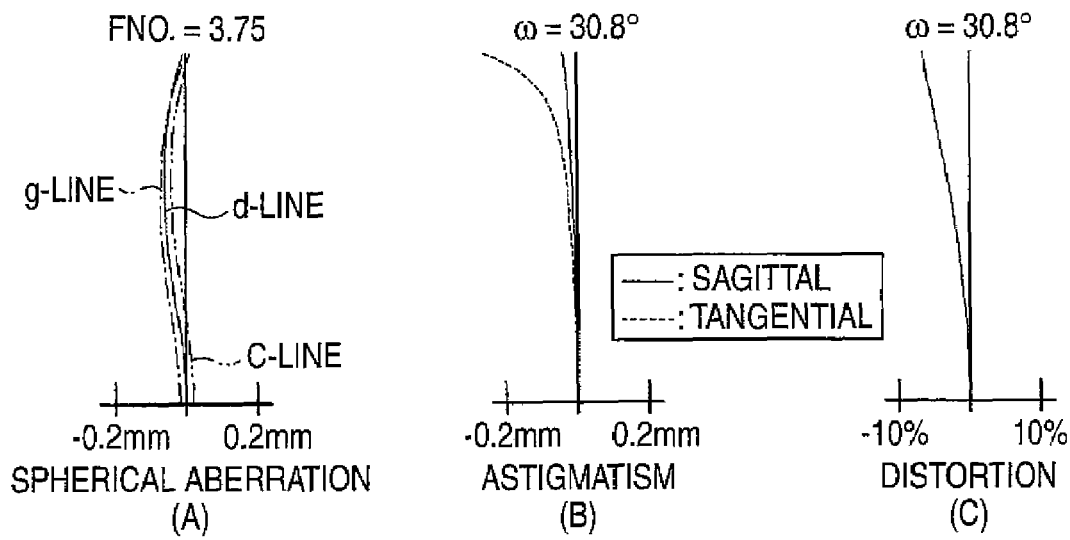
FIG. 21 are aberration diagrams showing various aberrations at the wide-angle end of the zoom lens according to Example 3, (A) shows aspherical aberration, (B) shows astigmatism, and (C) shows distortion.
Figure 22:
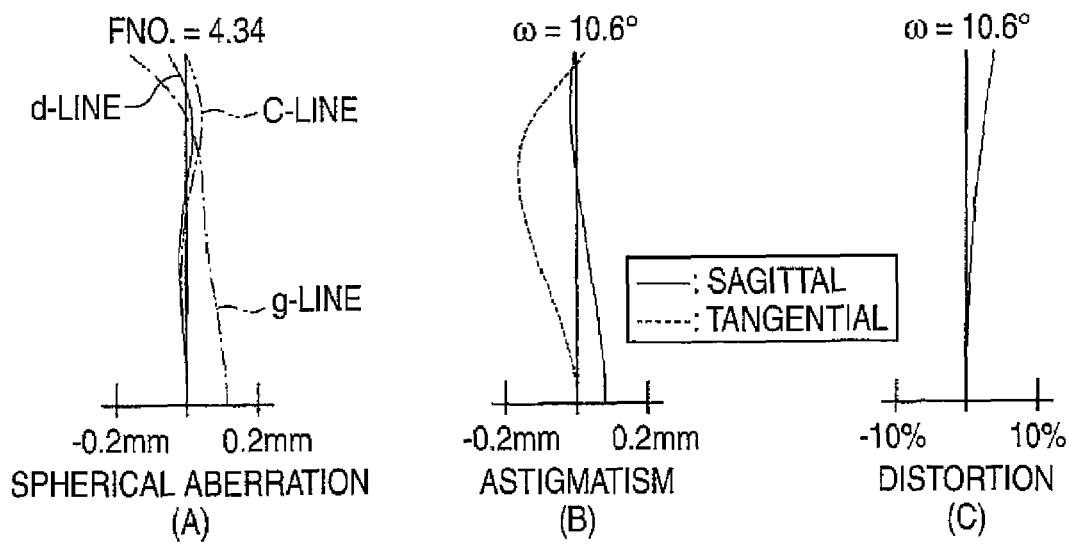
FIG. 22 are aberration diagrams showing various aberrations at the telephoto end of the zoom lens according to Example 3, (A) shows aspherical aberration, (B) shows astigmatism, and (C) shows distortion.
Figure 23:
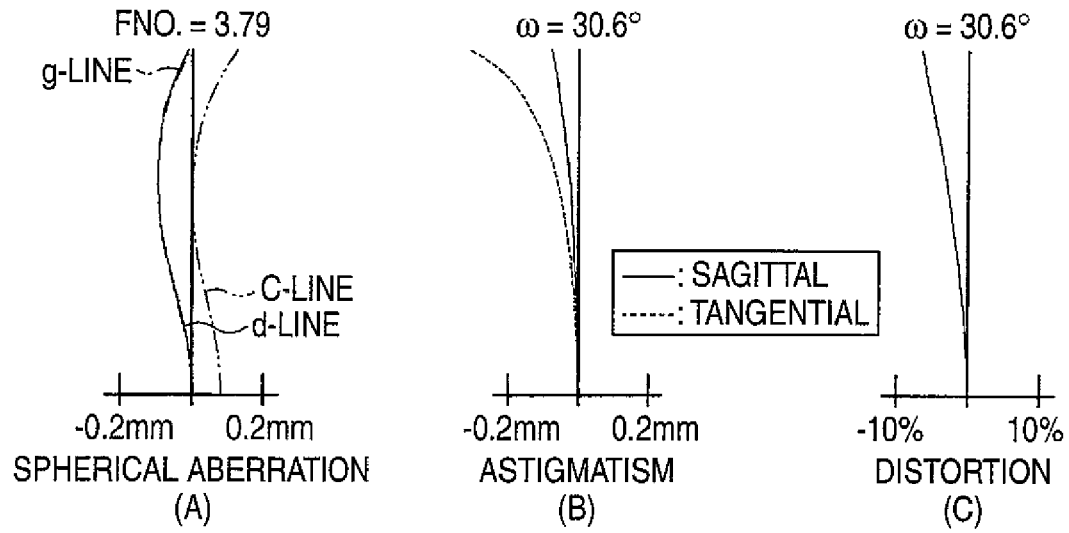
FIG. 23 are aberration diagrams showing various aberrations at the wide-angle end of the zoom lens according to Example 4, (A) shows aspherical aberration, (B) shows astigmatism, and (C) shows distortion.
Figure 24:
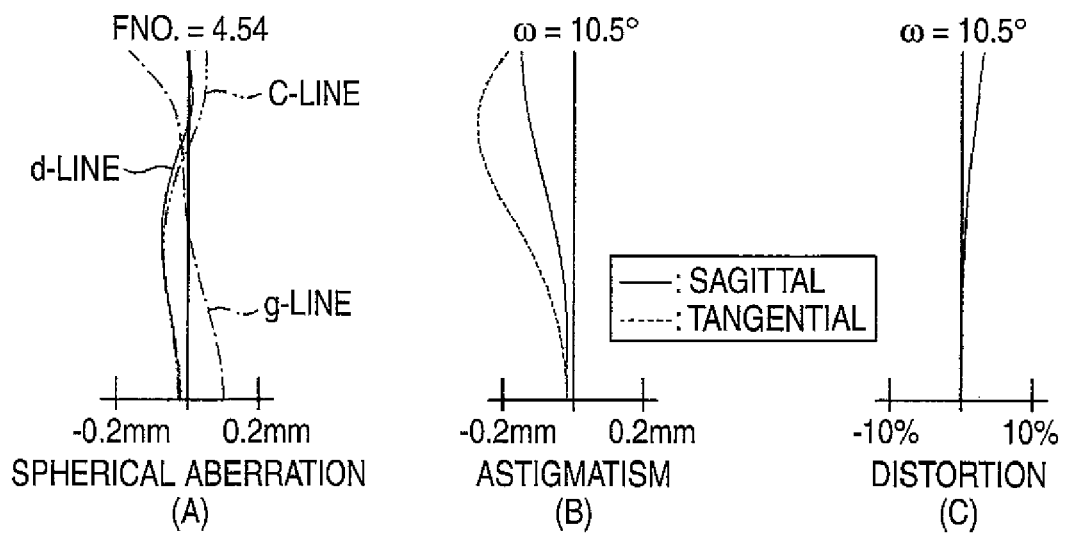
FIG. 24 are aberration diagrams showing various aberrations at the telephoto end of the zoom lens according to Example 4, (A) shows aspherical aberration, (B) shows astigmatism, and (C) shows distortion.
Figure 25:
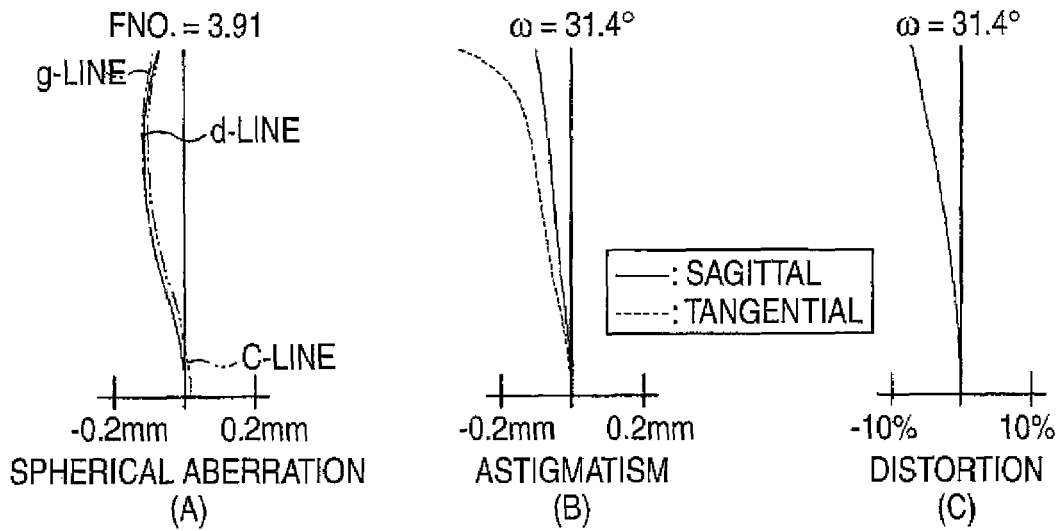
FIG. 25 are aberration diagrams showing various aberrations at the wide-angle end of the zoom lens according to Example 5, (A) shows aspherical aberration, (B) shows astigmatism, and (C) shows distortion.
Figure 26:
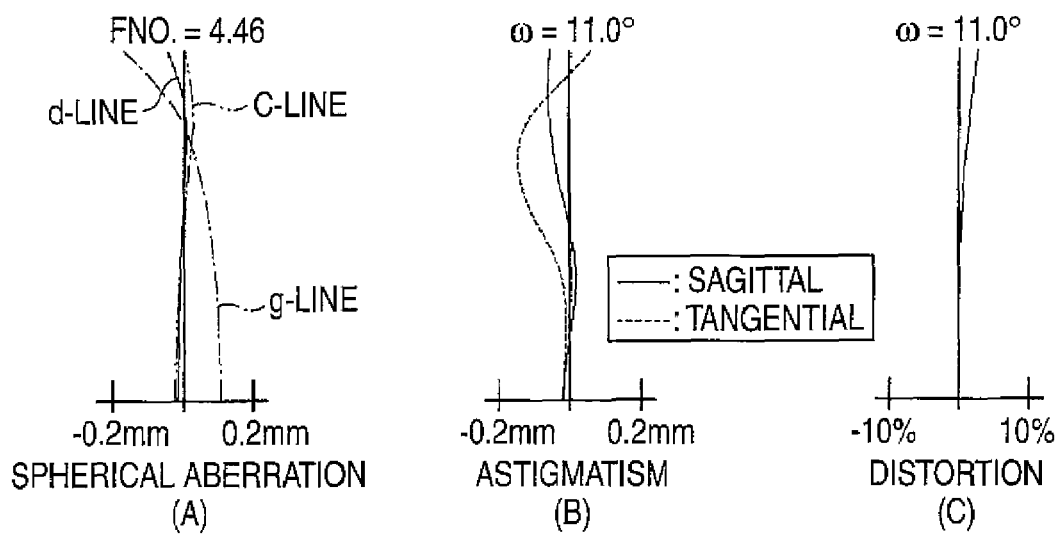
FIG. 26 are aberration diagrams showing various aberrations at the telephoto end of the zoom lens according to Example 5, (A) shows aspherical aberration, (B) shows astigmatism, and (C) shows distortion.

Similarly, various aberrations of the zoom lens according to example 2 are shown in FIG. 19(A) through FIG. 19(C) (wide-angle end) and FIG. 20(A) through FIG. 20(C) (telephoto end). Similarly, various aberrations of the zoom lens according to Example 3 are shown in FIG. 21(A) through FIG. 21(C) (wide-angle end) and FIG. 22(A) through FIG. 22(C) (telephoto end), various aberrations of the zoom lens according to Example 4 are shown in FIG. 23(A) through FIG. 23(C) (wide-angle end) and FIG. 24(A) through FIG. 24(C) (telephoto end), and various aberrations of the zoom lens according to Example 5 are shown in FIG. 25(A) through FIG. 25(C) (wide-angle end) and FIG. 26(A) through FIG. 26(C) (telephoto end).

As is known from the respective numerical data and the respective aberration diagrams mentioned above, in the respective examples, the zoom lenses in which the various aberrations are excellently corrected and which are small-sized and are provided with excellent optical performances can be realized.

Further, the invention is not limited to the examples of the respective examples but can variously be modified. For example, the values of the radii of curvature, the on-axis spacings and the refractive indices of the respective lens components are not limited to values shown in the respective numerical value examples but other values can be adopted therefor.

Further, the invention is not limited to the zoom lens of four groups constitution of a whole but is applicable also to a zoom lens including 5 groups or more of lens groups.

What is claimed is:

1. A zoom lens comprising: in order from an object side of the zoom lens, a first lens group having a positive power as a whole and including in order from the object side, a negative lens, a reflecting member that bends an optical path by substantially 90°, and a positive lens having biconvex shape at least one surface of which is an aspherical surface;

a second lens group having a negative power as a whole and including two lenses;

a third lens group having a positive power as a whole; and a fourth lens group having a positive power as a whole and including in order from the object side, a cemented lens having a negative power and a positive lens having a meniscus shape at least one surface of which is an aspherical surface and an object-side surface of which is convex, wherein the zoom lens is adapted to change a magnification thereof by moving the second lens group and forth lens group, and the zoom lens satisfies conditional equations:

$$-0.6 < f2/ft < -0.3 \quad (1)$$

$$0.8 < f4/ft < 1.5 \quad (2)$$

$$30 < vd1 \quad (3)$$

wherein f2 designates a focal length of the second lens group;

f4 designates a focal length of the fourth lens group;

ft designates a focal length at a telephoto end of the zoom lens; and vd1 designates an Abbe number at the d-line of a negative lens on the most object side of the first lens group.

2. The zoom lens according to claim 1, wherein
the two lenses of the second lens group are a negative lens having a biconcave shape and a positive lens having a meniscus shape an object-side surface of which is convex, in order from the object side, and
the second lens group satisfies a conditional equation:

$$|RN| > |RP| \qquad (4)$$

wherein
RN designates a radius of curvature of an image-side surface of the negative lens in the second lens group; and
RP designates a radius of curvature of an object-side surface of the positive meniscus lens in the second lens group.

3. The zoom lens according to claim 1, wherein the third lens group consists of a positive lens made of a resin material, the positive lens having at least one aspherical surface.

4. The zoom lens according to claim 2, wherein the third lens group consists of a positive lens made of a resin material, the positive lens having at least one aspherical surface.

5. An imaging apparatus comprising:
a zoom lens according to claim 1; and
an imaging device that outputs an imaging signal in accordance with an optical image formed by the zoom lens.

* * * * *